US 006641922B2

(12) United States Patent
Shores

(10) Patent No.: US 6,641,922 B2
(45) Date of Patent: Nov. 4, 2003

(54) SILICONE AND IONICALLY MODIFIED ISOCYANATE ADDUCT

(76) Inventor: A. Andrew Shores, 212 Carroll Canal, Venice, CA (US) 90291

( * ) Notice: Subject to any disclaimer, the term of this patent is extended or adjusted under 35 U.S.C. 154(b) by 28 days.

(21) Appl. No.: 09/848,388

(22) Filed: May 2, 2001

(65) Prior Publication Data

US 2002/0127413 A1 Sep. 12, 2002

Related U.S. Application Data

(60) Provisional application No. 60/261,731, filed on Jan. 17, 2001.

(51) Int. Cl.$^7$ ................................................ B32B 9/04
(52) U.S. Cl. .................. 428/447; 428/352; 428/355 R; 427/208; 427/208.8; 427/209; 427/411; 427/412.1; 525/477; 525/478
(58) Field of Search ................................ 428/352, 447, 428/355 R; 427/208, 208.8, 209, 411, 412.1; 525/477, 478, 9

(56) References Cited

U.S. PATENT DOCUMENTS 5,356,706 A * 10/1994 Shores ........................ 428/352
5,543,171 A *  8/1996 Andrew ...................... 427/177
6,352,768 B1 *  3/2002 Hseih et al. ................ 428/352

FOREIGN PATENT DOCUMENTS

GB         1128642        9/1968

\* cited by examiner

*Primary Examiner*—Robert Dawson
*Assistant Examiner*—Christopher M. Keehan

(57) ABSTRACT

An isocyanate adduct comprising the reaction product of a composition comprising in admixture a polyisocyanate, a silicone having dimethylsiloxane segments containing one or more of an isocyanate-reactive group bonded to said segments through an intermediate organic group, a reactant containing one or more of an isocyanate-reactive group, and one or more acid group or amine group, optionally an organic substance having one or more isocyanate-reactive groups, and compound providing counterion for said acid or amine group, wherein either the silicone, or the reactant, or both, have a single isocyanate-reactive group.

24 Claims, No Drawings

SILICONE AND IONICALLY MODIFIED ISOCYANATE ADDUCT

CROSS REFERENCE TO RELATED APPLICATIONS

This application claims the benefit of copending U.S. Provisional Application Ser. No. 60/261,731, entitled "Silicone-Modified Urethane Oligomer, filed Jan. 17, 2001, the teachings of which are incorporated by reference."

BACKGROUND OF THE INVENTION

1. Field of the Invention

This invention discloses a water-reducible isocyanate adduct having dimethylsiloxane segment and ionic group. Emphasis is being placed on the use of the compound as release coating in adhesive-coated products as well as a process for creating adhesive tapes and labels.

2. Description of the Prior Art

A pressure-sensitive adhesive tape is generally manufactured and sold with the tape wound upon itself in convolutions to form a roll of some suitable length of tape. Consequently, when it is necessary to use the tape, it must be possible to unwind the desired length from the roll without excessive force or delaminating of the backing, offsetting of the adhesive, or the like, regardless of the time or conditions under which the tape has remained in roll form prior to use. For these reasons, a coating known as a release coat or backsize is generally provided on the backside of the tape backing member, i.e., the side opposite that on which the adhesive mass is applied. Such a coat, compared to an uncoated backing member, as is its objective, offers relatively low adhesion to the adhesive mass.

Although various release agents and compositions thereof have been developed over the years, none of them, to my knowledge, accomplishes all the objects desired by their use. With some release agents, the release characteristics diminish with time, and particularly at high temperatures, because of some chemical or physical change in the release material per se. Others interact with the adhesive mass so that adhesion to various substrates to which the tape is applied is adversely affected.

Whether a material is suitable or not as a release agent, in particular for pressure-sensitive adhesive tapes, depends upon a number of factors. The lower the interfacial tension between the adhesive mass and the material used as a release coating, naturally the better release provided. However, low interfacial tension alone is not enough. The material, to be useful as a release coat, should also be of a suitable cohesive strength and possess good adhesion with the backing member.

In the 1970's, silicone emulsions in water were introduced. Generically, they were dimethylsiloxane oligomers with Si—H reactive groups. They had to be mixed with a catalyst prior to application to paper or plastic film, which made them inconvenient 2-component systems. Upon evaporation of water, a surface film of the oligomer was deposited, which built up in molecular weight, crosslinked, and a solid coating resulted. This process, called "cure", needed either high temperatures or long time at moderate temperatures.

The necessity for curing the polymeric material after deposition has placed certain restrictions on the use of silicones. This is because the temperature needed for curing, at least to the extent desired, has often exceeded the temperature, which a substrate on which a release coating is deposited could withstand. This has been particularly true where the substrate is a thermoplastic film or a paper-thermoplastic film laminate, care being needed to avoid melting or distorting the thermoplastic film. In paper substrates, high temperatures result in over-drying of paper.

A further disadvantage associated with silicone release polymers is their relatively poor adhesion to certain plastic films on which they are coated. This poor adhesion is thought to be due to the scarcity of polar groups in the silicone. Consequently, the use of a primer is often needed to obtain better anchorage of the silicone film to the substrate. In addition, the release characteristic in itself is sometimes a problem in that too good a release is provided. Thus, tape rolls may be too easy to unwind and, in some cases, the adhesion between the adhesive mass and release coat may be so low that the roll doesn't remain tightly wound.

U.S. Pat. 4,287,109 of Schlak et al. discloses an aqueous resin of a Silicone-Si—O—C-Polyester block copolymer.

B.P. 1,128,642 of Keberle et al. and G.P. DE 37 30 780 A1 of Nagorski et al. disclose water base silicone-modified polyurethanes. Keberle suggests their use for impregnating and coating fabrics, leather, paper, glass, wood, laminates and foamed plastics for anti static finishes and hydrophobic coatings, and as binder, lubricant, mold release agent, cleaning agent, leveling agent and corrosion inhibitor. Nagorski suggests usage as coating for wood, metal, paper, synthetic fabric, flock and leather.

EPA 0 342 826 of Higgins and its corresponding U.S. Pat. No. 5,082,704 disclose a silicone-modified polyurethane dispersion in water which may be used to fabricate a release liner for adhesives, most notably for asphalt roofing materials.

EPA 0 380 236 A2 of Leir discloses an amino-terminated silicone, its preparation, the preparation in a solvent of an anionic, nonionic and cationic silicone modified polyurea and its dilution with water, and its use as an elastomer, a pressure sensitive adhesive and a low adhesion backsize.

My own inventions, U.S. Pat. Nos. 5,356,706 and 5,543,171, disclose processes for manufacturing aqueous release coatings for pressure sensitive adhesive tapes by reacting a siloxane oligomer having 2–3 isocyanate-reactive groups and a diol having an acidic group with an excess polyisocyanate, and further reacting, in water, with a tertiary amine to form a salt and a primary or secondary polyamine to extend the prepolymer into a polymeric chain.

U.S. Pat. No. 5,679,754 of Larson et al. disclose fluorinated polyurethane with sulfonate groups as release agent dispersion in water.

U.S. Pat. Nos. 5,750,630 and 6,072,019 of Sengupta disclose a "polyurethane polymer whose chain includes silicone-containing segments and whose polymer chain is end-capped with a single isocyanate-reactive silane group" and a 2.5–30 weight percent solution in water of the polyurethane.

SUMMARY OF THE INVENTION

A coating can be prepared from polyisocyanates and reactants having only one isocyanate-reactive group. The reactions product is an isocyanate adduct that may have urethane/urea/amide bond. For simplicity it is hereon referred to as urethane, or isocyanate adduct, with many advantages as coating materials over the prior art polymeric urethanes. Examples of coatings are release agents for pressure sensitive adhesive tapes and labels. Other examples are mold release agents, finish materials for fibers, fabrics or paper products, overprint varnishes, printing inks and write-on office products, such as note pads coated with a pressure sensitive adhesive.

This invention comprises an isocyanate adduct comprising the reaction product of a composition comprising in admixture:

A. Polyisocyanate,
B. Silicone having dimethylsiloxane segments and one or more isocyanate-reactive group bonded to said segment through an intermediate organic group,
C. Reactant with one or more isocyanate-reactive group, and one or more acid group or amine group,
D. Optionally organic substance having one or more isocyanate-reactive groups, and
E. Compound providing a counterion for said acid or amine group,
Wherein either silicone B, or reactant C, or both, have a single isocyanate-reactive group.

This invention further discloses a process for manufacturing a pressure sensitive adhesive-coated product comprising the steps of:

i. providing an isocyanate adduct comprising the reaction product of a composition comprising in admixture:
  A. Polyisocyanate,
  B. Silicone having dimethylsiloxane segments and one or more isocyanate-reactive group bonded to said segment through intermediate divalent organic group,
  C. Reactant with one or more isocyanate-reactive group and one or more acid or amine groups, and optionally
  D. Organic substance having one or more isocyanate-reactive groups,
  Wherein either silicone B, or reactant C, or both, have single isocyanate-reactive group,
ii. reacting said acid or amine group with a compound providing counterion,
iii. mixing with water to form dilute solution or dispersion,
iv. coating a substrate with said solution or dispersion and removing water by heat, and
v. coating with a pressure sensitive adhesive.

The order of some of the steps may be reversed. For example, ionization may be accomplished by prereacting the acid group of reactant C, prior to reacting with isocyanate, with base or with a compound providing a negative counterion to the amine. Furthermore, if a solvent solution of the adduct is desired, step ii may be omitted, the mixing in step iii is carried out with a solvent to form a dilute solution, and the solvent is removed in step iv.

The new urethane compound of this invention has a number of advantages over the prior art polyurethanes:

It provides easier release than the prior art release agents at the same silicone concentration in the molecule
The concentration of the expensive silicone moiety, which is part of the release agent, can be reduced by a factor of 2–4 while maintaining the same release properties
The adduct can be prepared and applied to tape backings either from solvent or water while any one of prior art release agents can be dispersed either in water or solvent, but not both
It can be manufactured in one reactor, instead of two, as my said previous polymeric release agents
It needs not contain expensive silanes, as Sengupta's urethane does
It can be manufactured and shipped at twice the active ingredient concentration level than that of prior art release agents, thus leading to the benefits of
Lower manufacturing cost per unit weight of release agent
Half as many containers, e.g. drums, are necessary to buy, inventory, ship to tape manufacturers, store and finally dispose of, all of which is costly.

Condensation polymers, such as polyurethanes, are synthesized by stepwise polymerization. In order to obtain good physical properties, such as strength and elasticity, they are prepared from polyfunctional reactants in close stoichiometric proportions, to build long polymeric chains containing hundreds of monomeric units and molecular weight well in excess of 20,000, up to about 200,000. Monofunctional monomers, even if they constitute only a small proportion of the reactants, are known to produce low molecular weight polymers, which result in poor physical properties. It was thus surprising to discover that the urethane adduct of this invention yielded excellent release properties for adhesive tapes, in many respect superior to polymeric urethanes, since monofunctional reactants are used in large proportions for its synthesis to limit their degree of polymerization to those of low molecular weight oligomers.

In the prior art urethanes, all the ingredients are polyfunctional safe for a small proportion of a monofunctional silane in Sengupta's patent, which provided release agent concentrations of 26–37% in solutions and those of my own inventions 27–31%. Higher concentrations of solids would yield too high, impractical, solution viscosities. In this invention the practical total solids concentrations in solutions or dispersion can be as high 50–65% without excessive viscosity build-up. The product can also be prepared at the melt with no solvent present.

A dilute aqueous, or solvent solution, or dispersion, of this invention can be coated onto various substrates without need for any further chemical buildup for their functioning as a film forming coating. It needs not be subjected to curing. One particular advantage resulting from this feature is the fact that the coating of this invention can be used with various heat-sensitive substrates.

The release agent of this invention offers good adhesion to various substrates, particularly to those used conventionally as backing members in pressure-sensitive adhesive tape manufacture. Moreover, consistent release is provided even with aggressively tacky adhesives.

The compound of this invention is characterized by a combination of properties not found in either moiety alone. The silicone portion contributes release from pressure sensitive adhesive, water repellency, oil repellency, and low friction. The polar groups provide good adhesion, without need for a primer, between the coating and various substrate materials. These divalent polar groups, e.g. carbamate, urea, thiocarbamate, as well as aromatic and ionic groups increase the glass transition temperature and render the compound solid, cohesive and high temperature melting when they are present in sufficient amount. In addition, the ionic groups provide water solubility.

Satisfactory release properties in some applications can be obtained by blending a minor quantity of the compound of this invention with a major proportion of a polymeric film former. It is surmised that during the coating process the compound of the invention blooms to the surface, and the coating exhibits properties of the compound of this invention.

DETAILED DESCRIPTION OF THE INVENTION AND PREFERRED EMBODIMENTS

The silicone segment in the urethane of this invention is introduced into the molecule by a compound having dimethylsiloxane segment and one or more isocyanate-reactive group bonded to said segment through an intermediate divalent organic group, such as alkylene, alkyleneoxy, or polyester, with Si—C linkage. Unlike the Si—O—C linkage, the Si—C bond provides hydrolytic stability. The dimethylsiloxane segment may be part of the main chain, or side chain. The number of dimethylsiloxane units per reactant molecule is generally 50, or less, in most cases 1–25.

Preferred silicone-containing compound of this invention are hydroxyl, thiol amino and carboxyl functional. Their reaction products with polyisocyanates are carbamates, or urethanes, thiocarbamates, ureas and amides. For simplicity they are all referred herein as urethanes or isocyanate adducts. The isocyanate-reactive groups may be placed either at the end of the molecule, or side chain. One to two reactive groups per molecule are preferred. An example of a series of such reactants have alkylene, alkyleneoxy, and their combination, such as —$(CH_2)_3$—O—$(CHRCH_2O)_n$H termination with R=H or $CH_3$ and n=0–50, preferably 5–20.

The other compound reacting with isocyanate has two different functionalities: one or more ionic or potential ionic group, either anionic or cationic, and one or more isocyanate-reactive group. Example of compounds with ionic or potential anionic groups are: hydroxyacetic acid, aminoacetic acid, 2,2'-dimethylol propionic acid, tartaric acid, lysine, N-2-aminoethyl-2-aminopropionic acid, N-2-aminoethyl-2-aminoethane sulfonic acid, the propoxylated adduct of 2-butene-1,4-diol with sodium bisulfite, N-2-aminoethyl-2-aminoethane phosphonic acid.

Another group of anionic compounds capable of reacting with isocyanate is the reaction product of a cyclic anhydride with a multifunctional compound capable of reacting with the anhydride and isocyanate. The multifunctional compound may be a polyamine, polyol, amino alcohol, amino acid and hydroxyacid. Examples of anhydrides are phthalic anhydride, hydrogenated phthalic anhydride, methyltetrahydro phthalic anhydride and succinic anhydride. The reaction product is an amide or ester having a carboxyl group and one or more group capable of reacting with the isocyanate. Part of the carboxyl groups may also react with isocyanate. Examples of multifunctional compounds reacting with the anhydride are 2-ethanolamine, N-methyl-ethanolamine diethanol amine, diisopropanol amine, 2-amino-2-ethyl-1,3-propanediol, N-ethyl-2-ethanol amine and 4-aminobenzoic acid.

Examples of suitable cationic groups in compounds also having isocyanate-reactive groups are —$NHR_2^+X^-$ or —$NR_3^+X^-$ wherein X may be a soluble anion, such as halide, hydroxide or carboxylate and R may be a alkyl, cycloaliphatic or aryl group with 1–6, preferably 1–4 carbon atoms. Examples of compounds providing negatively charged counterion to the amine group are ethyl bromide, 2-chloroacetamide, acetic acid and dimethyl sulfate.

Other types of hydrophilic groups are nonionic ones exemplified by hydroxyl, polyoxyethylene and oxypropylene segments. They may be bonded to the silicone or introduced into the urethane of this invention by the reaction of a molecule having polyethylene glycol or polypropylene glycol segments with the isocyanate. However, their concentration should be limited since they tend to increase the water sensitivity of the urethane.

Any of the polyisocyanates heretofore used for the formation of polyurethanes are suitable for the purposes of the present invention although diisocyanates and triisocyanates are preferred. Those diisocyanates, which can be used in the practice of the invention, in general, include aromatic, aliphatic and cycloaliphatic diisocyanates. In addition, mixtures of two or more species, kinds and types of the isocyanate functional component can be employed.

Examples of polyisocyanates that can be employed in the instant invention include toluene-2,4-diisocyanate, a mixture of toluene-2,4- and toluene-2,6-diisocyanate, metaphenylenediisocyanate, methylene-bis-2,4- and 2,6-phenylisocyanate (MDI), hydrogenated MDI, isophorone diisocyanate, hexamethylene diisocyanate and polymeric MDI's, which are mixtures of di- and triisocyanates based on MDI. Isocyanate terminated prepolymers can also be used as well as mixtures of isocyanates with average fractional values of isocyanate functionality. In the broad context of the present invention, it will be appreciated that polyisocyanates also include those compositions that provide requisite isocyanate functionality within the polyisocyanate composition to react with both components B and C as herein described.

Examples of counterions for acids are bases, such as ammonia, potassium hydroxide, triethylamine, N,N'-dimethylpropylamine, N-methyl-di-(2-ethanol)amine, N-methylmorpholine, ethanolamine and ethylene diamine. Volatile amines, such as lower alkyl amines, aminoalcohols and ammonium hydroxide are preferred.

The nature and amount of the reactants determine the degree of release from pressure-sensitive adhesives. Prior arts reported that higher silicone content, without upper limit, in the urethane polymer results in better release. Thus, high silicone-content polyurethanes were commercialized, at great expense, to satisfy many demands. In contrast, the urethane monomer and oligomer of this invention attain excellent release values at low silicone levels, 5–10%, and further increase in silicone content levels off the release value. Other characteristics attributed to silicones, such as slip, and hydrophobicity is in the same line. Practically, the dimethylsiloxane content in the adduct of this invention for most applications is 1–10% and rarely exceeds 20%.

The proportion of polyisocyanate, providing hard segments for the copolymer, is generally in the range of 15–60%, and most are in the range of 25–45%.

The amount of reactant having isocyanate-reactive groups and acid or amine group is also important since it provides dispersibility and solubility through the ionic groups. Useful amounts of carboxyl content in the copolymer were found to be in the range 20–300 mEq./100 g of urethane. Lower amounts are not enough to disperse or solubilize the adduct in water while higher ones render the coating water sensitive. The preferred range is 60–200 mEq./100 g. The ionic strength of sulfonic acid and phosphonic acid groups is much higher than that of the carboxylic acid group. Consequently, considerably lower amount of these anionic groups are required to solubilize the urethane in water. The amount of the cationic compound depends on the number carbon atoms in the molecule and the amount of other hydrophilic groups but their proportion should be sufficient to disperse or solubilize the urethane in water.

The functionalities of the ingredients B and C may be combined. Thus, this invention comprises an isocyanate adduct comprising the reaction product of a composition comprising in admixture:

A. Polyisocyanate,
B. Silicone with dimethylsiloxane segment having one or more isocyanate-reactive group and one or more acid group or tertiary amine group, wherein said groups are bonded to said segment through an intermediate organic group, and C. Compound providing counterion for said acid or amine group.

The synthesis to form urethane of this invention is preferably carried out in two steps. In the first stage of the reaction, an isocyanate terminated compound is formed by reacting the silicone containing compound and a potential ion-containing monomer with a stoichiometric excess of a polyisocyanate. This reaction may be carried out neat or in the presence of a solvent to reduce viscosity. Heat or catalyst may be used to speed up the reaction, although mild reaction conditions, generally below 100° C., are preferable to avoid side reactions. Suitable inert solvents, containing no active hydrogen capable of reacting with the diisocyanate, may be used to reduce the viscosity. Examples of such solvents are N-methyl-2-pyrrolidone, acetone, methyl acetate and propyleneglycol methylether acetate and their mixture.

As the reactions are exothermic, it may be only necessary to mix the various components together and allow the temperature to rise to the exotherm temperature and further adjusting the temperature with or without external heating or cooling. The reaction is conducted under anhydrous conditions for such a time at the selected temperature that is practical to provide the desired results.

The quantity of organic polyisocyanates to be used in the invention is dependent upon the quantity of active hydrogen groups in the monomer and oligomer, the particular isocyanate compound used, the molecular weight of the isocyanate, the isocyanate (NCO)/isocyanate-reactive group ratio, etc. All of these factors, while influencing the amount of isocyanate to be used are easily taken into account by one skilled in the art to determine the precise amount of NCO groups required in any particular formulation. The initial stoichiometric ratio of NCO to the sum of isocyanate-reactive groups in the practice of this invention is generally between about 1.2 and 4, preferably 1.4–2.5 and most preferable 1.5–2. Lower ratios may increase the viscosity, which may be difficult to handle, and increases the solvent demand, while higher ones may decrease the compound's solubility and create excessive foaming if it is further reacted in the presence of water.

If desired, catalysts that are normally used to accelerate the NCO reaction can be employed in the instant invention, particularly with aliphatic isocyanates. The use of a catalyst is particularly useful to accelerate the secondary OH/ortho-NCO reaction, the SHINCO and the COOH/NCO reactions. These catalysts include tertiary amines such as triethylamine, tributylamine, pyridine, N-methylmorpholine, and organometallic compounds such as stannous octoate, dibutyl tin dilaurate, zinc octoate and cobalt naphthenate.

The NCO terminated compound thus prepared may be further reacted with said silicone B, reactant C or the optional substance D, or their combination. Such mono- or multifunctional substances may be amines, alcohols, aminoalcohols, ammonia and carboxylic acids. Examples are methanol, propyleneglycol, methoxypropanol, dipropyleneglycolmonomethyl ether, water, morpholine, propylenediamine, adipic acid, hydroxyacetic acid, and lysine. Large stoichiometric excess may be applied when multifunctional substances are used to cap the isocyanate.

The isocyanate-terminated compound may also be reacted in aqueous medium with either water or a mono- or polyamine in the presence of a volatile amine. In most cases, the amine is dissolved in water and the organic phase is poured into it while stirring vigorously. A large stoichiometric excess may be applied in the case of a polyamine to limit the molecular weight. Another option is to neutralize the potential anionic groups first with a tertiary amine followed by chain extension with water. This method is particularly useful with aliphatic isocyanates.

The solvent or water solution, or dispersion, of the urethane of this invention can be diluted further with water to provide a solution of the desired concentration, for example 0.25 to 5% by weight solids, for coating. It can be cast on a substrate and the water is evaporated, thereby casting a thin film of the urethane on the substrate. No crosslinking is necessary to obtain functional properties. A fast drying water-miscible solvent, such as isopropyl alcohol, may be added, if desired, to improve drying speed.

One of the advantages of this invention is that it effectively doubles the solids content on preparation. This makes it easier to prepare a neat (100% active) product by solvent evaporation, such as spray drying or oven drying. The neat product is less costly to transport from the manufacturing plant to the tape processing facility where it is redissolved in a solvent, or preferably, dissolved or dispersed in water. On drying the adduct at high temperature some of the counterion-providing material, e.g. amine or quaternizing agent, may be lost by evaporation. It may be necessary to add these materials when redissolving the dried release agent.

Optionally, the adduct of this invention may be increased in molecular weight, especially following coating on the web and drying. This is normally not necessary but may be desirable if increased heat stability and higher resistance to humidity and solvent are desirable for some particular application. Suitable chemicals reacting with the carboxyl groups of the adduct are multivalent metal compounds, such as chromic nitrate, zinc acetate and polyaziridine compounds. N-(2-aminoethyl)-3-aminopropyl trimethoxysilane, an optional co-reactant with the polyisocyanate would also be a crosslinker. The metallic compounds act instantaneously on evaporation of water from a backing member on which it had been coated. Polyisocyanate and polyepoxy compounds react at slower rates. Other chemicals that may be used, which result in multiple carbon-to-carbon double bonds in the urethane, are reacting by oxidative, or "drying", mechanism.

The adduct of this invention can be used alone or mixed with various polymeric film formers. Such compositions are of particular advantage, as satisfactory release and other functional properties in some instances can be provided much more economically, for example, when the substrate coated is relatively porous as is the case of a paper backing member in the manufacture of pressure-sensitive adhesive tape. The release agent is present in the release composition in only minor amounts, usually 1 to 10%. Thus, as the siloxane release agent is the more expensive component of the release compositions, its use therein results in considerable savings. Since the urethane of this invention needs no cure, it can be intermixed with various film formers including those, which heretofore could not withstand the silicone curing temperatures, and therefore could not be used. Examples of film formers in emulsion form are polyvinyl acetate, ethylene vinylacetate copolymers, polyamides, polyacrylics, polyurethanes, epoxy resins, polyvinyl chloride homo and copolymers, and their mixtures. It is theorized that the composition of this invention migrates to the outer surface of a coating, thus providing the desirable surface characteristics.

The urethane of this invention can be applied to various substrates, such as plastic film, glass fabric, metal foil, paper and latex impregnated paper by various means. Plastic films are usually coated with a #3–20 Meyer rod, #130–250 rotogravure roll or a series of rotating smooth rolls. Where the substrate is fibrous, e.g., papers and textile fabrics, the polymeric material can be applied by such operations as immersion, spraying, brushing, and roll coating. The more complete the coverage the better the results obtained.

After a layer of the solution is coated on the desired substrate, heat, moving air, or their combination may be applied to volatilize water and any solvent, if present, thereby leaving a deposit or coating of the release agent or composition on the substrate. The heat necessary to accomplish the desired evaporation depends on the air volume, air velocity and the coating weight. They can easily be determined by those skilled in the art for any particular situation. The prime consideration is that the volatiles' evaporation be complete.

A further aspect of the invention comprises a pressure-sensitive adhesive product, which includes a backing member, a pressure-sensitive adhesive and the novel release coating. Such products include tapes, labels and write-on office products such as repositionable note pads, sticky pads, "STIK-EM" notes and "Post-it" notes or pads. The urethane of this invention may be applied to these products as release agent, release agent-ink blend for printing and overprint varnish.

The pressure-sensitive adhesive composition may comprise in admixture elastomers, a tackifying resins and additives. The elastomer may be styrene-isoprene or styrene-butadiene block or random copolymers, natural rubber or ethylene-vinylacetate rubber. Other generic adhesives may also be used, such as polyacrylates, polyurethanes and vinyl ether polymers. The adhesive is applied to the backing member in the form of a solvent solution, aqueous emulsion or hot-melt by methods of calendering, extrusion, kiss roll coating, etc. The solvent or water is removed from the adhesive composition by evaporation by heating. The adhesive product is then generally wound on itself for storage and for slitting into rolls or sheeted out into suitable width and length. The coverage of pressure-sensitive adhesive composition (on a dry basis) is preferred to be in the range of between about 0.5–4.0 ounces per square yard but may be outside this range if required for specific purposes.

The invention is more particularly described in the following Examples as a release agent per se or as a component of a release coating composition for pressure-sensitive adhesive tapes. By virtue of its properties, however, the urethane of this invention will be found suitable in numerous applications such as protective film or paper, water repellent coating for masonry, such as concrete, stone, etc. Other applications include coating for fibrous containers, conveyor belts, and various coverings and items which come into contact with such sticky and tacky materials such as bread dough, rubber, candy, plastics, the adhesive under linoleum and tile surface, during manufacture, transportation, and storage of these materials. Other uses include mold release agent and release surface from various substrates; water repellent coating in paper, textile, and metal finishing and antiblock and slip agent for inks and coatings.

The invention will now be further illustrated and described by reference to the following specific Examples. The quantities and proportions are expressed in this Application in grams, and percent by weight, unless specifically stated otherwise.

The term mE below designates mill-equivalent.

EXAMPLE 1

This Example illustrates the preparation and evaluation of the product of this invention from the three essential monomers A, B, and C, wherein the silicone B has only one isocyanate-reactive group.

Diethanolamine, 18.5 (176 mM, 353 mE-OH) was dissolved in a mixture of acetone, 46.7 and N-methyl-2-pyrrolidone (NMP), 20, and phthalic anhydride (PAN), 25.5 (172 mM and 172 NE-COOH) was sifted in gradually while stirring and cooling externally with ice-water while the internal temperature was 50–55° C. (Solution A). Infrared spectrum of the reaction-product confirmed that the reaction product was an amide having carboxyl and hydroxyl groups.

An 80/20 mixture of 2,4- and 2,6-toluenediisocyanate (TDI), 36 (413 mE-NCO) was charged into a reactor and portion of the above-prepared solution, 65.9 (210 mE-OH), was added slowly while stirring and cooling to maintain 50–55° C. during the reaction. To this solution was than mixed into a monocarbinol-terminated silicone (SIL1), 20.0 g (19 mE-OH), having the formula $Me_3SiO(Me_2SiO)(MeSiO)(CH_2)_3O(CH_2CH_2O)_nH$, wherein Me is methyl group and n=7.6, molecular weight 600 and viscosity 35 cps. The mixture was left to react at 50° C. for four hours to let all the OH groups consume. The isocyanate-terminated compound was further reacted at 50° C. overnight with the remainder of the Solution A to yield a clear solution. The carboxyl function was than neutralized with N,N'-dimethyl ethanolamine (DMEA), 9.2 and further diluted with water, 6.9 and methanol, 13.9, to yield a clear solution having 56% adduct content (AC) and 5900 cps viscosity (VIS). The solid isolated from the solution had softening temperature (ST) of 86–92° C.

EXAMPLE 2

This Example illustrates the preparation and evaluation of the product of this invention wherein the ion-providing C monomer has only one isocyanate-reactive group and there are two kinds of optional D monomer included: one with one isocyanate-reactive group and another with two isocyanate-reactive groups.

N-methylethanolamine, 6.8 (92 mM, 93 mE-OH) was dissolved in a mixture of NMP, 54.3 and propyleneglycol methyletheracetate (PMA), 27.2, and PAN, 13.2 (89 mM and 89 mE-COOH) was sifted in gradually while stirring and cooling externally with ice-water while the internal temperature was 50–55° C. Infrared spectrum of the reaction-product confirmed that the reaction product was an amide having carboxyl and hydroxyl groups.

TDI, 39 (447 mE-NCO) was charged into a reactor and the above-prepared solution, was added slowly while stirring and cooling to maintain 50–55° C. during the reaction. This was followed by stirring in a linear dimethylsiloxane oligomer (SIL2), having di-omega groups of $—(CH_2)_3O(CH_2CH_2O)_{15}H$ and OH equivalent of 1150, 20.1 (19 mE-OH). The mixture was left to react at 60° C. for one hour to let all the OH groups consume. The isocyanate-terminated compound was then further reacted at 30–60° C. with 8 g (70 mE-NH) polyoxypropylene diamine (PPOA), of the formula $H_2NCHCH_3CH_2(OCH_2CHCH_3)_nNH_2$, amine equivalent 115, followed by capping with methanol, 3.1 (97 mE-OH) with an additional 1.0 g excess methanol stirred in, and reacted for 2 hours at 55° C. It was then cooled to ambient and mixed with DMEA, 7.9 (89 mM) to yield a clear solution with AC=55%, VIS=5900 cps and ST=86–88° C.

EXAMPLE 3

This Example illustrates the preparation and evaluation of the product of this invention wherein both the silicone monomer B and the ion-providing C monomer have each one isocyanate-reactive group.

N-methylethanolamine, 9.0 (120 mE-OH) was dissolved in aNMP, 81.8 and PAN, 17.7 (117 mM and 117 mE-COOH) was sifted in gradually while stirring and cooling externally with ice-water while the internal temperature was 50–55° C. The solution was then mixed with triethyleneglycol, 6.0 (80 mE-OH) and gradually added to TDI, 34.5 (396 mE-NCO) and reacted while maintaining 55–60° C. The NCO-functional intermediate was then reacted with SIL1, 20 (35 mE-OH), as in Example 1 and further reacted with PPOA, 15.4 (134 mE-NH) as in Example 2. It was then was cooled to ambient and mixed with DMEA, 8.2 (92 mM) to yield a clear solution with AC=55%, VIS=5300 cps and ST=84–87° C.

EXAMPLE 4

This Example illustrates the preparation and evaluation of the product of this invention wherein the amount of the silicone monomer B was reduced to 15% of the solids. N-methylethanolamine, 6.8 (91 mM, 91 mE-OH) was dissolved in a mixture of NMP, 53.8 and PMA, 26.9, and PAN, 13.2 (89 mM) was sifted in gradually while stirring and cooling externally with ice-water while the internal temperature was 50–55° C. The solution was then mixed with triethyleneglycol, 12.0 (160 mE-OH) and reacted with TDI, 41.5 (476 mE-NCO) as in Example 3. The NCO-functional compound was then reacted with SIL2, 15 (14 mE-OH), further reacted with PPOA, 8.0 (70 mE-NH), capped with methanol, 2.5 (108 mE-OH) and an additional 1.0 g methanol was mixed into the solution, all as in Example 3. It was then cooled to ambient and mixed with DMEA, 5.9 (66 mM) to yield a clear solution with AC=55%, VIS=7300 cps and ST=88–89° C.

EXAMPLE 5

This Example illustrates the preparation and evaluation of the product of this invention wherein the amount of the silicone monomer B was further reduced to 11% of the adduct.

N-methylethanolamine, 8.0 (107 mE-OH) was dissolved in a mixture of NMP, 48.6 and PMA, 32.2, and PAN, 15.6 (106 mM) was sifted in gradually while stirring and cooling externally with ice-water while the internal temperature was 50–55° C. The solution was then mixed with triethyleneglycol, 11.8 (157 mE-OH) and reacted with TDI, 42.0 (482 mE-NCO) as in Example 3. The NCO-functional intermediate was then reacted with SIL2, 11 (10 mE-OH), further reacted with PPOA, 8.3 (73 mE-NH), capped with methanol, 3.3 (103 mE-OH) and an additional 1.0 g methanol was mixed into the solution, all as in Example 3. The solution was cooled to ambient and mixed with DMEA, 7.1 (78 mM) to yield a clear solution with AC=55%, VIS=8300 cps and ST=86–92° C.

EXAMPLE 6

This Example illustrates the evaluation, as release agents in adhesive tapes, of the products prepared in the previous Examples and compares them to the prior art release agent.

A biaxially oriented polypropylene (BOPP) film, 30 micron thick, was corona treated on both sides to yield surfaces of 42 dynes/cm surface tension. It was then coated on one side with 3% aqueous solutions of the urethanes of Examples 1–5 using a #6 Meyer rod and dried in an oven at 65° C. for 10 minutes. The release-coated films were than laminated with commercially available pressure sensitive adhesive tapes and submitted to accelerated aging at 72° C. for 16 hours. The tapes were then peeled from the films at a T-peel mode at a speed of 25 cm/min and the force required to peel was measured. The peeled tapes were then laminated to a finely polished flat stainless steel plate, peeled at an 180° angle and the peel force measured. For comparison, test specimen were made up similarly by laminating the tapes to uncoated BOPP, designated as NO RA, and to BOPP coated with the release agent composition of U.S. Pat. No. 5,356,706 having 40% silicone, designated as PRIOR ART. The following adhesive tapes were laminated to the release-coated BOPP:

Packaging Tape: "Super Strength Packaging Tape" manufactured by 3M Company, 2" wide, believed to have a 50 micron thick BOPP backing and a hot melt adhesive based on a styrene-isoprene-styrene block copolymer mixed with a high melting temperature terpene resin.

Masking Tape: Anchor tape #504, 1" wide, believed to have an adhesive based on natural rubber and SBR.

T-peel values from the release agents (RA) and adhesion to steel (ASS) are reported in gram force units in Table 1. The analysis of the results show that the release agents of this invention are in general better than the polymeric release agent disclosed in the prior art.

TABLE 1

| EXAMPLE | % SIL1 | % SIL2 | % ACTIVE | Packaging Tape | | Masking Tape | |
| --- | --- | --- | --- | --- | --- | --- | --- |
| | | | | T-Peel, g | ASS, kg | T-Peel, g | ASS, kg |
| 1 | 20 | — | 60 | 450 | 3.1 | 320 | 1.5 |
| 2 | — | 20 | 55 | 210 | 2.9 | 180 | 1.3 |
| 3 | 19 | — | 55 | 330 | 3.0 | 320 | 1.4 |
| 4 | — | 15 | 55 | 230 | 3.0 | 200 | 1.5 |
| 5 | — | 11 | 55 | 260 | 3.1 | 220 | 1.5 |
| PRIOR ART | — | 40 | 29 | 610 | 3.0 | 280 | 1.3 |
| NO RA | — | — | — | 1600 | Adhesive Delam. | 1100 | Adhesive Delam. |

EXAMPLE 7

This Example shows that incorporating a small amount of release agent of this invention blended with a film former yields good unwind characteristics in adhesive tapes.

The release agent of Example 2 was blended with an emulsion of polyvinyl acetate in water at the 10% (dry/dry) level.

The formulation was coated onto a latex impregnated paper backing member in an amount to provide a dry weight of 14 g/m². This was accomplished by heating the coated paper to remove water and fuse the backsize.

The backsize coated backing member was then coated with a hot melt adhesive formulated with a styrene-isoprenestyrene block copolymer, and tackified with rosin ester tackifiers, after which the mass coated sheet was slit to 25 mm wide rolls of tape. These were oven aged for 16 hours at 72° C. and tested for unwind adhesion and adhesion to stainless steel. The results are indicated below:

Unwind Adhesion (unwinding speed=350 ft/min): 240 g/25 mm

Adhesion to SS: 920 g/25 mm.

EXAMPLE 8

This Example illustrates the good release characteristics obtainable with pressure sensitive adhesive-coated notepads by using the composition of this invention.

Clay coated craft paper having thickness of 10.9 kg/276 $m^2$ (24 lb/ream) was coated with a 2% TS solution in water of the urethane solution of Example 5 using a #6 Meyer rod and dried in a 72° C. oven for 5 minutes. The coated paper was laminated with a 25 mm strip of a pressure sensitive adhesive-coated paper taken from a note pad manufactured by 3M Company under the Post-it brand name. A similar laminate was made with the same craft paper not coated with the urethane solution of this invention (Control).

The laminate was aged in an oven at 50° C. for 2 weeks and tested for T-peel adhesion at a separation rate of 30 mm/min (12"/min). The force required to separate the laminates was 8 g/25 mm for the release-coated paper and 80 g/25 mm for the uncoated paper.

I claim:

1. Reaction-product comprising an isocyanate adduct of a composition comprising in admixture:
   A. Polyisocyanate,
   B. Silicone having dimethylsiloxane segments and one or more isocyanate-reactive group bonded to said segment through intermediate organic group,
   C. Reactant with one or more isocyanate-reactive group, and one or more acid group or anune group,
   D. Optionally organic substance having one or more isocyanate-reactive groups, and
   E. Compound providing counterion for said acid or amine group,
   Wherein either silicone B, or reactant C, or both, have single isocyanate-reactive group, and wherein said reaction-product can be dissolved at concentration greater than 40% and up to about 65%.

2. Adduct according to claim 1 wherein said dimethylsiloxane segments consists of 1–25 dimethylsiloxane units, said intermediate group is alkylene or alkyleneoxy and said isocyanate-reactive groups are selected from the group consisting of hydroxyl, primary amino, secondary amino, carboxyl and thiol or mixtures thereof.

3. Adduct according to claim 1 wherein said polyisocyanate is selected from the group consisting of isomers of toluene diisocyanate, isomers of methylene-bis-phenylisocyanate, polymeric methylene-bis-phenylisocyanate, hexamethylene diisocyanate, isophorone diisocyanate and isomers of hydrogenated methylene-bis-phenylisocyanate, or mixtures thereof.

4. Adduct according to claim 1 wherein said reactant has carboxylic acid, sulfonic acid or phosphonic acid groups.

5. Reactant according to claim 4 selected from the group consisting of 2,2'-dimethylol propionic acid, hydroxyacetic acid, aminoacetic acid, tartaric acid, lysine, N-2-aminoethyl-2-aminoethane sulfonic acid, the propoxylated adduct of 2-butene-1,4-diol with sodium bisulfite, and combinations thereof.

6. Adduct according to claim 1 wherein said reactant is the reaction product of a cyclic anhydride having one anhydride group with a multifunctional compound capable of reacting with said anhydride and polyisocyanate.

7. Adduct according to claim 6 wherein said multifunctional compound is selected from the group consisting of polyamine, polyol, amino alcohol, amino acid and hydroxy-acid.

8. Adduct according to claim 6 wherein said anhydride is either phthalic anhydride or hydrogenated phthalic anhydride and said compound is selected from the group consisting of 2-ethanol amine, N-methyl-2-ethanolamine, diethanol amine, diisopropanol amine, 2-amino-2-ethyl-1,3-propanediol and 4-aminobenzoic acid.

9. Adduct according to claim 1 wherein said substance is selected from the group consisting of amines, alcohols, aminoalcohols, ammonia, carboxylic acids and water.

10. Adduct according to claim 1 wherein said counterion is halide, hydroxide or carboxylate.

11. Adduct, according to claim 1, which is a release agent in an adhesive coated product.

12. Product, according to claim 11, which is an adhesive tape or label.

13. Adduct, according to claim 1, blended with a film-forming polymer.

14. Blend, according to claim 13, wherein said polymer is selected from the group consisting of vinylacetate homo and copolymers, polyacrylates, polyvinyl chloride homo and copolymers, polyesters, amino resins and epoxy resins.

15. Adduct, according to claim 1, as a coating selected from the group consisting of ink, overprint varnish, paint, finish material for fibers, fabrics or paper products and mold release agent.

16. Process for manufacturing a pressure sensitive adhesive-coated product comprising the steps of:
   i. Providing the reaction product of a composition comprising in admixture:
      A. Polyisocyanate,
      B. Silicone having dimethylsiloxane segments and one or more isocyanate-reactive group bonded to said segment through intermediate divalent organic group,
      C. Reactant with one or more isocyanate-reactive group and one or more acid or amine groups, and optionally
      D. Organic substance having one or more isocyanate-reactive groups,
      Wherein either silicone B, or reactant C, or both, have single isocyanate-reactive group,
   ii. Reacting said acid or amine group with a compound providing counterion,
   iii. Mixing with water,
   iv. Coating a substrate with the mix in iii and removing water by heat, and
   v. Coating with a pressure sensitive adhesive.

17. Process according to claim 16 wherein steps i and ii are reversed or performed simultaneously.

18. Process according to claim 16 wherein the step of providing the isocyanate adduct comprises preparing the isocyanate adduct in the presence of an inert organic solvent.

19. Process according to claim 18 wherein said adduct is dried prior to mixing with water.

20. Process according to claim 16 wherein said adhesive is a pressure sensitive adhesive comprises styrene-isoprene or styrene-butadiene block or random copolymers, natural rubber or ethylene-vinylacetate rubber.

21. Reaction product of a composition comprising in admixture:
   A. Polyisocyanate,
   B. Silicone with dimethylsioxane segment having one or more isocyanate-reactive group and one or more ion-forming acid group or tertiary amine group, wherein said groups are bonded to said segment through an intermediate organic group, and
   C. Compound providing counterion for said ion-forming acid or amine group.

22. Pressure sensitive adhesive-coated product comprising the reaction-product of a composition comprising in admixture:
   A. Polyisocyanate,
   B. Silicone having dimethylsiloxane segments and one or more isocyanate-reactive group bonded to said segment through intermediate divalent organic group,
   C. Reactant with one or more isocyanate-reactive group and one or more acid or amine groups, and optionally
   D. Organic substance having one or more isocyanate-reactive groups,
   Wherein either silicone B, or reactant C, or both, have single isocyanate-reactive group.

23. Product, according to claim 22, which is either a self-wound tape, label, or repositionable note pad.

24. Product, according to claim 1, wherein said reaction-product can be dissolved at concentration 50–65%.

* * * * *